G. GUNTHER.
NON-SKID DEVICE FOR MOTOR VEHICLES.
APPLICATION FILED JUNE 12, 1918. RENEWED FEB. 3, 1920.
1,352,260. Patented Sept. 7, 1920.
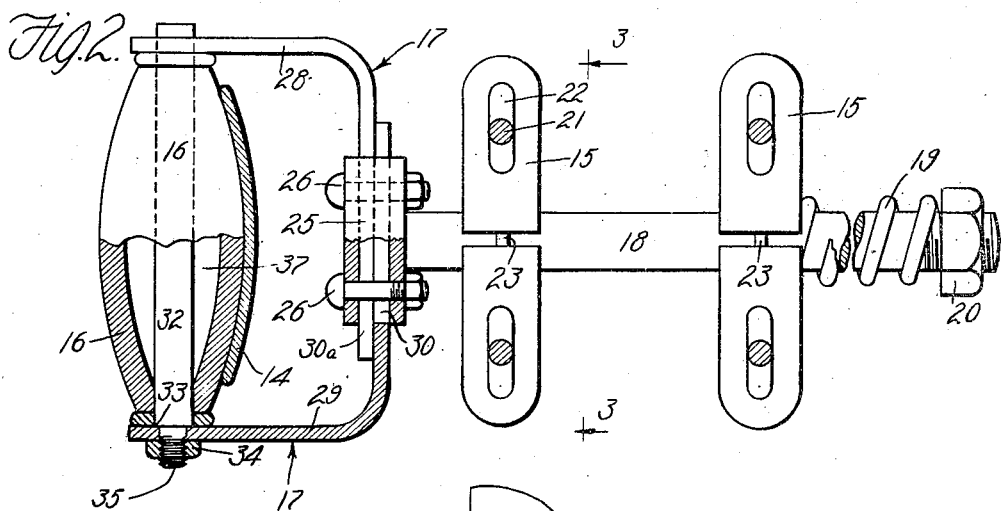
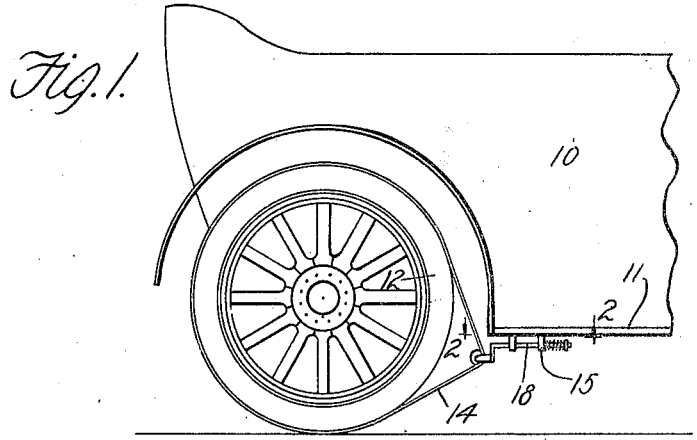
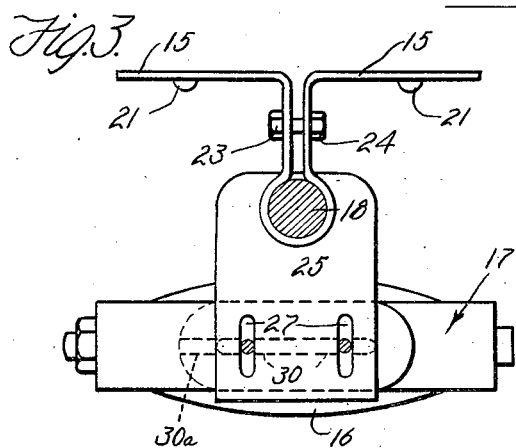
Inventor
George Gunther
his Attorney

UNITED STATES PATENT OFFICE.

GEORGE GUNTHER, OF SEATTLE, WASHINGTON.

NON-SKID DEVICE FOR MOTOR-VEHICLES.

1,352,260. Specification of Letters Patent. Patented Sept. 7, 1920.

Application filed June 12, 1918, Serial No. 239,656. Renewed February 3, 1920. Serial No. 355,959.

*To all whom it may concern:*

Be it known that I, GEORGE GUNTHER, a citizen of the United States, residing at Seattle, county of King, State of Washington, have invented new and useful Improvements in Non-Skid Devices for Motor-Vehicles, of which the following is a specification.

This invention relates to improvements in non-skid and traction increasing devices for motor vehicles and it is a prime object of this invention to provide a device that can be easily adjusted to meet the varying conditions that a device of this character is often subject to.

My invention relates particularly to certain improvements in and to the invention for which Letters Patent No. 1,217,442, dated Feb. 27, 1917, was issued to George Gunther and William P. Miller. My improvements are on a device which embodies an endless belt passing around the driving wheel of the vehicle and over an idler pulley. Among my improvements I provide means for adjusting the idler pulley either vertically or horizontally, locking it in a fixed position when necessary and lubricating it thoroughly. The following detailed description will make clear the construction and also the features of my invention.

In Figure 1 is shown a side elevation of the device applied to the traction wheel of an automobile; Fig. 2 is an enlarged section taken on line 2—2 of Fig. 1; and Fig. 3 is a section taken on line 3—3 of Fig. 2.

In the drawings 10 designates the body of an automobile, 11 its running board, and 12 its driving or traction wheel. The idler pulley 16 over which the belt 14 runs is mounted on the running board 11 by means of the bearings 15. The belt 14 may be made of any suitable material such as fabric or the like and the bearings 15 may be mounted on any suitable part of the automobile. On one end of the shaft 18, which is held by bearing 15 is a yoke 17 in which pulley 16 is mounted while on the other end of shaft 18 is a compression spring 19 which bears against bearing 15 and nut 20, said nut being screw-threadedly engaged upon shaft 18, thereby making adjustment possible. The object of this spring arrangement is to keep shaft 18 and pulley 16 to the right in Fig. 1 and thus keep a suitable tension on belt 14. This tension may be regulated or varied to suit the conditions by adjusting nut 20. The bearings 15 which hold shaft 18 are mounted on the running board 11 by means of bolts 21 which pass through slots 22, said slots facilitating adjustment of bearing 15 to the left or right and thereby making it possible to get the shaft 18, and therefore pulley 16, in a central vertical plane with the wheel 12. The shaft 18 is normally free in bearing 15, thus allowing pulley 16 to rotate or accommodate itself to the belt 14.

It has been found in practice, however, that when a new belt is run over an old tire, the tread of which is not exactly even, that the belt will not shape or crown itself properly, and will tend to run to one side. I have overcome this difficulty in my improved form of device by providing a means for setting or locking pulley 16 temporarily in any suitable position that will cause the belt 14 to shape or crown itself properly. I accomplish this by making the bearings 15 in the manner clearly shown in Fig. 3 of the drawings. The bolt 23 and nut 24 provide a means whereby shaft 18 and therefore the pulley 16 is locked in a position that will cause the belt to be properly broken in. When it is desired to have shaft 18 rigidly set the nut 24 is screwed tightly on bolt 23, thereby causing bearing 15 to grip said shaft. But when it is advantageous to have shaft 18 loose in the bearing 15 the nut 24 can be loosened, thereby allowing the shaft to rotate.

The yoke 17 which holds the pulley 16 is adjustably mounted on a bracket 25, said bracket being permanently mounted on the end of shaft 18. The yoke 17 is fastened to bracket 25 by means of bolts 26 which pass through slots 30 in the yoke and slots 27 in the bracket. The vertical slots 27 in bracket 25 provide a means for raising or lowering the pulley 16 to conform with the various conditions and constructions met with in different types and makes of motor vehicles. This feature of my invention makes the mounting of the device simple under conditions that would, with the old form of construction, be more complex.

There is in use a large variety of sizes of automobile tire which makes it necessary to use various sized pulleys. With my invention, however, I make it possible to use various sized pulleys in the same yoke. The yoke 17 is adjustable in length, being made of two arms 28 and 29 in which are slots 30. Bolts 26 pass through slots 30 and thus form a means for fastening arms 28 and 29 securely to bracket 25. The slots 30 are the means by which the yoke is made adjustable. They make it possible for arms 28 and 29 to be brought close together to accommodate a small pulley or be spread apart for a large one; and they also make it possible to adjust the yoke as a whole to one side or the other, to put the yoke, and pulley 16, in alinement with wheel 12. These slots make it also possible to easily move the arm 28 out far enough to disengage it from shaft 32 and far enough to disengage its open ended slot 30ª from one of the bolts. The arm may then be turned down and the pulley 16 slipped off the shaft endwise. The shaft 32 on which pulley 16 is mounted has a shoulder 33 which bears against arm 29. A nut 34 is screw-threadedly engaged on the ends 35 of axle 32, thus fastening said shaft firmly on arm 29. The arm 28 holds the other end of shaft 32 and also keeps pulley 16 in place.

It is very obvious that the pulley 16 must be thoroughly lubricated when the device is in operation. Various means may be employed to do this. In other forms of devices of this character lubrication is accomplished by means of oil or grease cups. Although this is an effective means of lubrication it requires attention and is very apt to be neglected, thus allowing the shaft or pulley to run dry. In my form of device I have simplified lubrication by eliminating these oil or grease cups or any other similar means and have provided a means whereby lubrication is positive. I accomplish this by making the inside of pulley 16 hollow as indicated in Fig. 2. The hollow portion 37 is filled with grease or any suitable lubricant before the pulley is slipped onto shaft 32. When once filled in this manner the pulley will be automatically lubricated for a long period of time.

By having the device made with the numerous adjustments above described, it is possible to set the pulley in any position that will make the operation of the device most effective.

The adjustability of yoke 17 which facilitates the use of various sized pulleys is very advantageous as it makes it possible to use the same device on any sized vehicle without changing any of the parts other than the pulley, while in other devices of this character it is necessary to change both the yoke and the pulley.

It will be understood that the form of device above described is merely typical and that an object of this invention is to have a device that is adjustable into any desired position. It is for this and other obvious reasons that I do not wish to limit myself to the particular means of adjustment herein described, but reserve to myself any changes or modifications that will produce the same result or fall within the scope of the following claims.

Having described my invention, I claim:

1. In combination with an automobile and a driving wheel thereof, an endless belt passing peripherally around the wheel being of greater length than the wheel circumference, a shaft mounted upon the automobile in the central vertical plane of the wheel capable of being longitudinally movable and rotatable or fixed from rotation, and a vertically and horizontally adjustable yoke carrying an idler puller on an axis transverse to the shaft, said pulley being inside said belt.

2. In combination with an automobile and a driving wheel thereof, an endless belt passing peripherally around the wheel being of greater length than the wheel circumference, a shaft mounted upon the automobile in the central vertical plane of the wheel capable of being longitudinally movable and rotatable or fixed from rotation, a vertically and horizontally adjustable yoke carrying an idler pulley on an axis transverse to the shaft, said pulley being inside said belt, and said yoke being adapted by horizontal adjustment to hold various sized pulleys.

3. In combination with an automobile and a driving wheel thereof, an endless belt passing peripherally around the wheel being of greater length than the wheel circumference, a shaft mounted upon the automobile in the central vertical plane of the wheel, a yoke on the end of the shaft, an idler shaft carried by the yoke, and an idler on said shaft, the yoke being mounted on the first mentioned shaft to be vertically and horizontally adjustable thereon and comprising two members adjustable with relation to each other to widen or narrow the width of the yoke.

4. In combination with an automobile and a driving wheel thereof, an endless belt passing peripherally around the wheel, being of greater length than the wheel circumference, a longitudinal shaft mounted upon the automobile with its axis substantially in the plane of the wheel, a roller carrying bracket mounted on the end of the shaft and embodying a pair of bracket members laterally adjustable with relation to each other and adjustable with relation to the shaft, a transverse roller carried between said bracket members and inside said belt.

5. In a device of the character described, a bracket carrying member, a bracket comprising two separate parts individually adjustable on said member and one of the parts removable from said member, and a pulley shaft carried by and between said bracket parts.

In witness that I claim the foregoing I have hereunto subscribed my name this 13th day of May, 1918.

GEORGE GUNTHER.

Witnesses:
CHARLES A. JESKE,
EUGENE T. BEHRENS.